E. W. JENKINS.
KNOT TYING DEVICE FOR GRAIN BINDERS.
APPLICATION FILED DEC. 29, 1913.
1,239,793.
Patented Sept. 11, 1917.
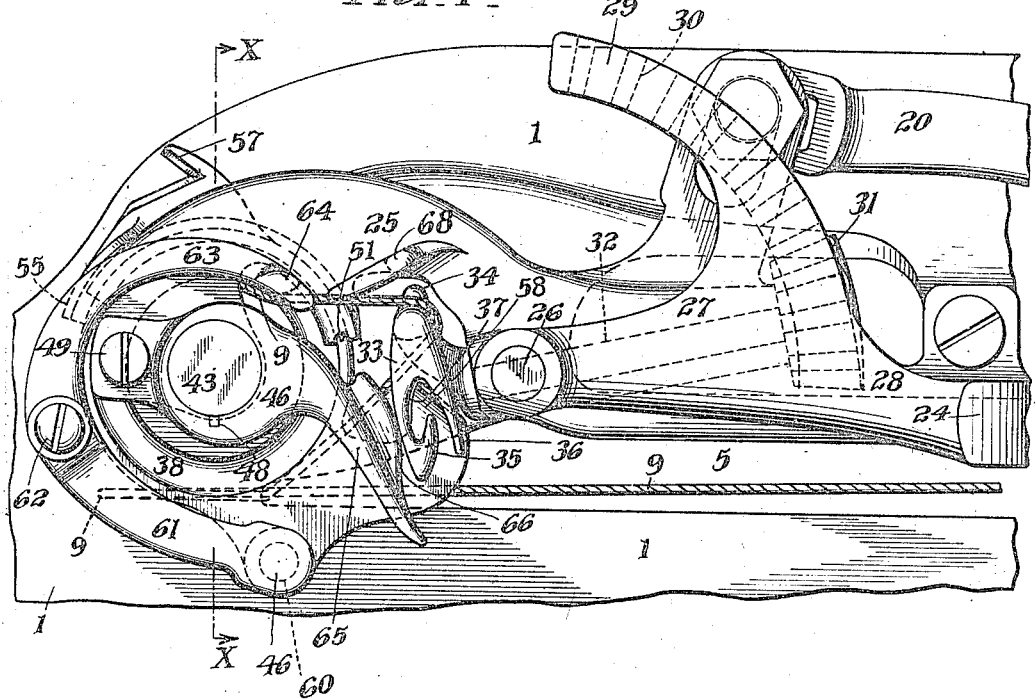
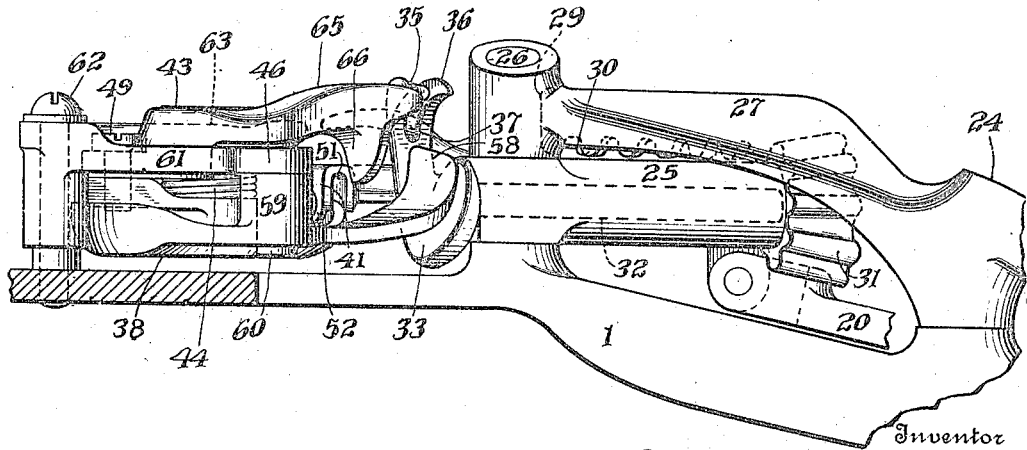
Witnesses
Daniel Webster, Jr.
E. W. Smith
Inventor
Edward W. Jenkins
By 
Attorney E. W. JENKINS.
KNOT TYING DEVICE FOR GRAIN BINDERS.
APPLICATION FILED DEC. 29, 1913.
1,239,793.
Patented Sept. 11, 1917.
4 SHEETS—SHEET 2.
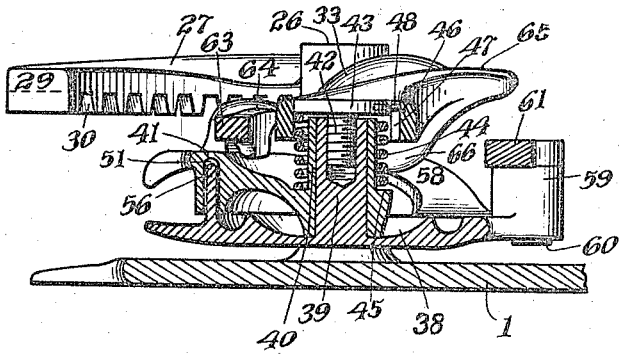
FIG. 4.
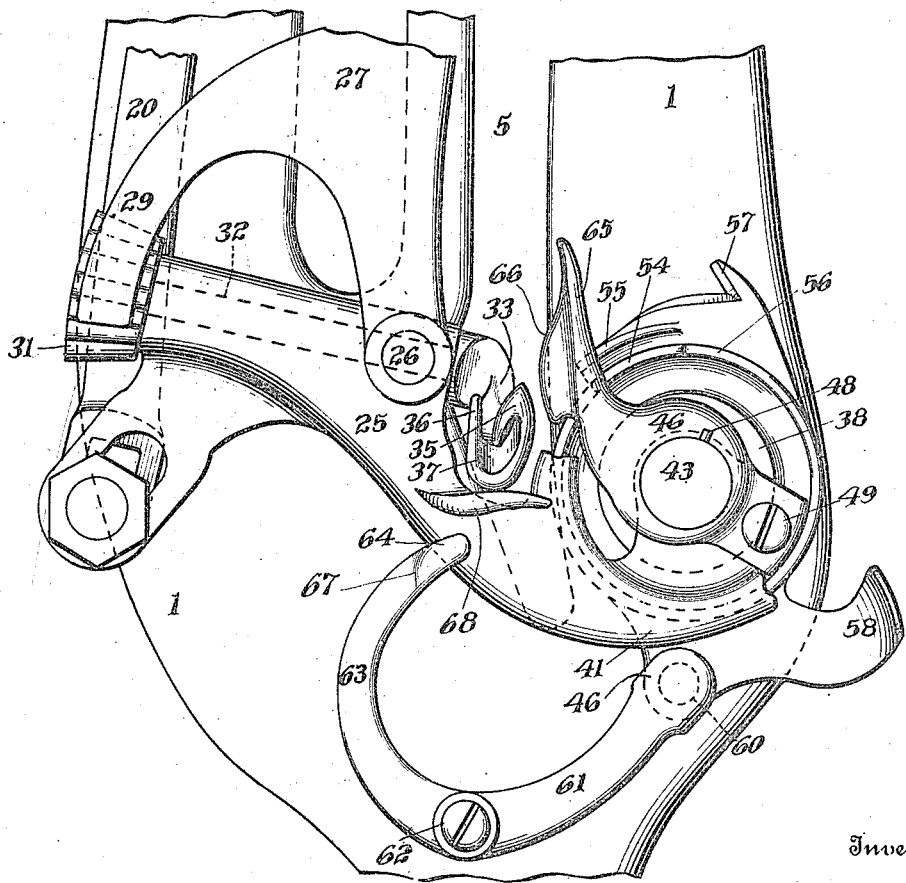
FIG. 3.
Witnesses
Daniel Webster Jr.
E. W. Smith
Inventor
Edward W. Jenkins.
By 
Attorney E. W. JENKINS.
KNOT TYING DEVICE FOR GRAIN BINDERS.
APPLICATION FILED DEC. 29, 1913.
1,239,793.
Patented Sept. 11, 1917.
4 SHEETS—SHEET 3.
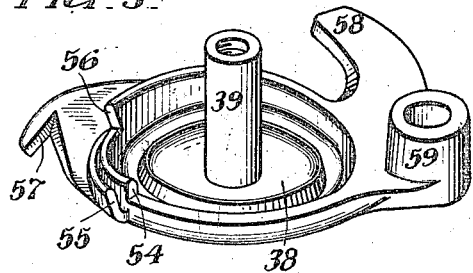
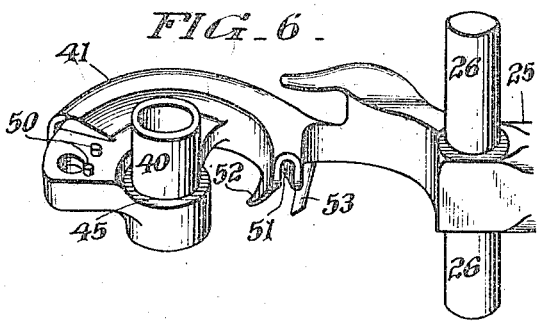
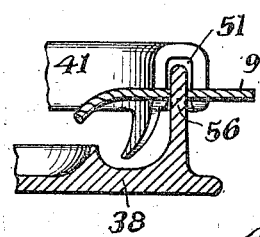
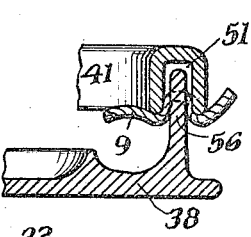
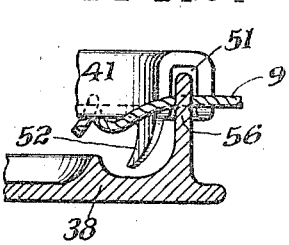
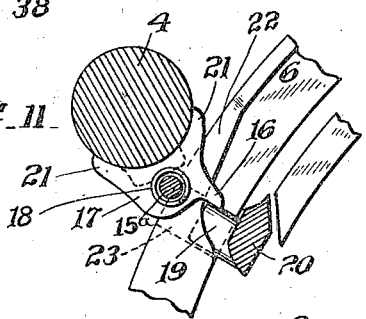
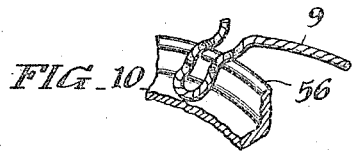
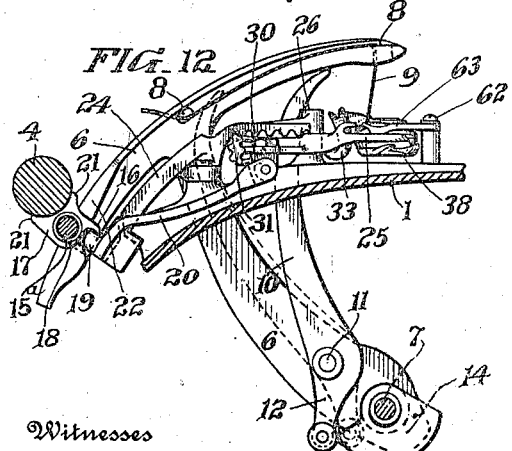
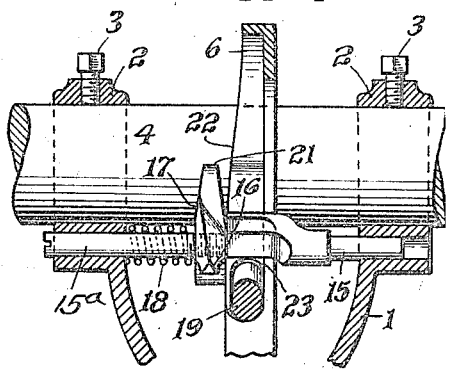
Witnesses
Daniel Webster Jr.
E. W. Smith
Inventor
Edward W. Jenkins
By
Attorney

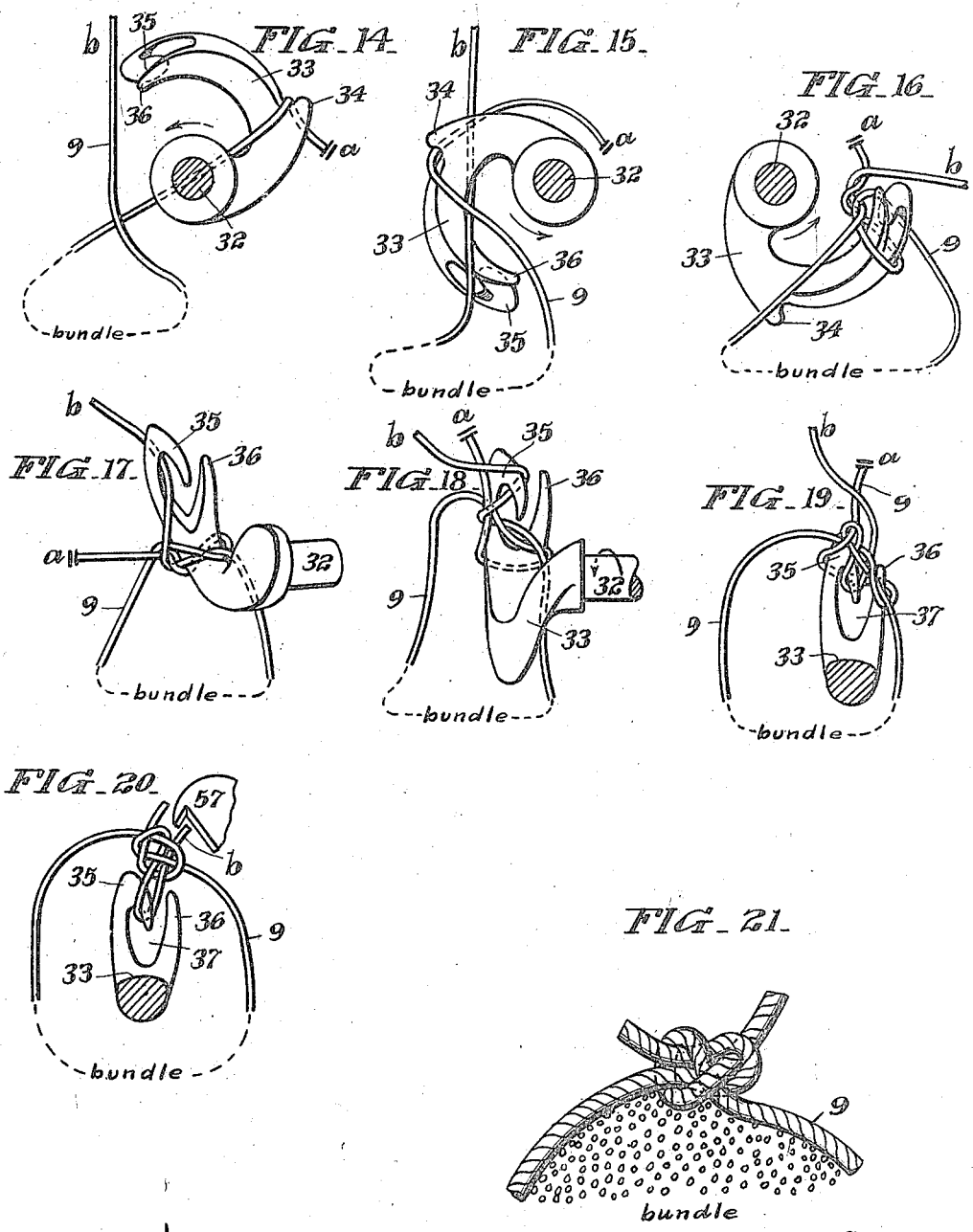

UNITED STATES PATENT OFFICE.

EDWARD W. JENKINS, OF NORRISTOWN, PENNSYLVANIA.

KNOT-TYING DEVICE FOR GRAIN-BINDERS.

1,239,793.	Specification of Letters Patent.	Patented Sept. 11, 1917.

Application filed December 29, 1913. Serial No. 809,214.

*To all whom it may concern:*

Be it known that I, EDWARD W. JENKINS, citizen of the United States, and resident of Norristown, county of Montgomery, and State of Pennsylvania, have invented an Improvement in Knot-Tying Devices for Grain-Binders, of which the following is a specification.

This invention relates to knot tying devices for grain binders or like mechanism, and relates more particularly to an improvement on my prior Patent No. 769,347, granted September 6, 1904. The object of my present invention is to provide a mechanism adapted for tying what is generally known in the art as a "weaver's knot" and the mechanism herein, embodying the features of novelty, has been devised with the object of eliminating a large number of parts heretofore deemed necessary in structures of this kind, also the simplifying of what has heretofore been a complicated, intricate, and more or less cumbersome structure for the tying of knots, and to provide in place thereof a number of parts so related and correlated as to produce through a succession of predetermined steps an automatic manipulation of a tying cord whereby the desired knot is not only formed in the ends of the cord, but the bundle loop of the said cord is drawn tight about the article or bundle and so remains taut without danger of becoming loose through handling of the bundle.

My invention embodies in combination a looper bill adapted to receive an oscillatory, substantially rotary movement, together with a novel form of cord gripping or clamping means having in conjunction therewith certain cord guiding, placing and cutting devices.

It further comprehends a novel form of locking mechanism whereby at certain times the aforesaid knot tying mechanism is rendered inoperative, so that the tying cord may be automatically or otherwise placed about the bundle to be tied, without danger of the parts being incorrectly positioned at the beginning of the knot tying operation.

My invention further consists of a novel form of retaining arm for packing the bundle and holding it in assembled condition during the encircling step of the cord about the bundle, as well as during the tying operation, the said retaining arm being automatically actuated at certain times in the cycle of operations.

It further consists of other novel features of construction, all as will be hereinafter fully set forth.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a plan of a knot tying mechanism embodying my invention, the same showing the parts in position to begin the tying operation;

Fig. 2 represents a side elevation of the same, with the parts in the same position;

Fig. 3 represents a plan on an enlarged scale showing the parts occupying the positions of partially completing the tying operation;

Fig. 4 represents a section on line X—X of Fig. 1;

Fig. 5 represents a perspective of the lower member of the gripping device;

Fig. 6 represents the coöperating parts of the gripping device showing also certain of the guiding adjuncts;

Figs. 7, 8 and 9 represent, respectively, sections or portions of the gripping device showing the binding material in different positions with respect to the gripping members;

Fig. 10 represents a perspective of a portion of the gripping device showing the binding material in its position during the final tying action;

Fig. 11 represents a transverse section of the driving shaft of the machine and showing in conjunction therewith a locking device for retaining the knot-tying device inoperative during a certain interval;

Fig. 12 represents a side elevation partly in section of the knot-tying mechanism and illustrating also the needle mechanism and its adjuncts;

Fig. 13 represents a detail of construction showing a portion of the driving shaft and the relation between the needle arm and the locking mechanism for the knot-tying device;

Fig. 14 represents a side elevation of the looper bill showing the position of the tying cord at the beginning of the knot-tying operation;

Fig. 15 represents the looper bill during the second step of tying a knot;

Fig. 16 represents the looper bill in the third position, or after the tying loop has been passed over the bill;

Fig. 17 represents the looper bill after it has passed through the loop and in position to reverse its direction of movement and draw the tying cord through the loop;

Fig. 18 represents the looper bill at the beginning of its return movement when it has drawn a strand of the tying cord about the other strand preparatory to passing the said tying cord through the loop;

Fig. 19 represents the looper bill drawing the free end of the tying cord through the loop;

Fig. 20 represents the looper bill completing the tying operation and showing also the cutter adjacent the cut end of the cord;

Fig. 21 represents the completed knot as tied by the machine.

1 designates the frame for supporting the novel knot tying mechanism embodying my invention, said frame being fixedly secured by means of ears 2 and set bolts 3 to a rod 4, fixed or suitably supported in any desired manner, it being understood that the frame 1 is stationary but may be positioned at any desired angle as occasion demands.

The frame 1, as here shown, is provided with a longitudinally disposed slot 5, through which the needle arm 6 is adapted to pass during its oscillating movement, being controlled in its movement by the rock shaft 7 to which the said needle arm 6 is keyed or otherwise secured. The needle arm 6 is provided with suitable guide openings 8 for properly positioning the tying cord 9 with respect to the knotting mechanism to be presently described.

10 designates an arm pivoted at 11 to the needle arm and having an extension 12 carrying a roller 13 which is adapted to contact with the surface of a cam 14, the latter being fixed to the aforesaid rock shaft 7 in order to lock the arm 10 in such a position that it will hold the material in a compact bundle during the binding of the cord about the said bundle and while the knot is being tied.

15 and 15ª designate spindles disposed transversely of the frame 1 to form a support for a locking finger 16 of the cam controlled member 17, it being understood that this member is secured on adjacent ends of the spindles 15 and 15ª which are slidingly mounted upon the frame 1 and maintained in locking position by means of a spring 18 on the spindle 15ª which normally holds the parts so that the finger 16 projects into the path of movement of a lug 19 carried by the knotter operating arm 20. The member 17 is recessed or slotted on its lower side to permit the passage of the needle arm 6. It will further be apparent, by reference to Fig. 11, that the cam member 17 is provided with suitable ears 21 which contact with the rod 4 and hold the said member 17 from rotating. In order to release the lug 19 from the locked position, the needle arm 6 is preferably provided with a side faced cam 22 which at a certain time in the travel of the needle arm engages the member 17 and thereby moves the same against the tension of the spring 18 thus removing the finger 16 from its locking position to permit releasing of the lug 19 and the arm 20. At the time the lug 19 is released from its locked position, the needle arm 6 has reached such a position that the socket 23 formed therein receives the lug 19 so that both the needle arm 6 and the knotter arm 20 thereafter move together.

24 designates a guide surface preferably formed integral with the frame 1 and arranged substantially concentric with the path of movement of the needle 6, whereby it forms a support for the lug portion 19 of the arm 20. In the present instance the arm 20 is pivotally secured to a rock frame 25, which in turn is pivotally mounted at 26 to one arm 27 of a yoke 28 which, in the present instance, forms a continuation of the frame 1 and has its opposite arm 29 provided with a rack segment 30. The function of the rock frame 25 is to form a support for both the cord positioning, gripping and cutting members, as well as the looper bill for tying the required knot.

31 designates a pinion normally in mesh with the rack 30 and fixedly secured to a spindle 32 which is rotatably mounted in the frame 25 and carries upon its end a substantially helical shaped looper bill 33 which is adapted during its oscillating movement to so engage the tying cord as to form the desired knot therein. To the end desired I have found it desirable to provide this looper bill 33 with a finger 34 arranged at a suitable point having at its extremity a hook 35 adjacent which there is an extension or prong 36 suitably spaced therefrom so that the cord may enter the recess 37 and thus finally be located back of the hook 35.

The gripping mechanism, as here shown, comprises a disk 38, having a post 39 formed integral therewith and substantially centrally disposed thereof, which post is adapted to fit within the bearing sleeve 40, forming a part of an extension 41 of the frame 25, the said parts being secured together by means of a yielding connection comprising the following construction. 42 designates a screw threaded stud having threaded engagement with the post 39 and having a head 43 which projects beyond the periphery of the bearing 40, in order to form a bearing surface for one end of a spring 44, which seats at its opposite end upon the shoulder 45 of the part 41. 46 designates an annular member adapted to encircle a portion of the stud 42, as well as the head 43 of the aforesaid stud 42, and the latter is prevented from rotation by providing the member 46 with a slot 47 to receive the pin 48, which is fixed to, or forms a part of the head 43. The member 46 preferably forms a part of the extension 41, being secured thereto by a screw 49 and pins 50, these latter maintaining the parts in fixed relation.

51 designates a groove formed in the under side of the extension 41, and partially encircling the post 39, the center of this latter being coincident with the center of curvature of the groove 51. One of the depending lips forming a side of the groove 51 is provided with a cord locking finger 52, while adjacent thereto, and upon the opposite side of the said groove, there is a depending pin 53, the function of which will later be explained. The plate 38, in order to have interfitting relation with the extension 41, is provided with a plurality of curved flanges 54 and 55, the same being spaced apart and so arranged that the curved flange 54 in certain positions of the parts enters the groove 51 while the adjacent flange 55 extends exterior thereof. The flange 55 is provided with a shoulder 56 which also serves to engage a portion of the tying cord so that two parts thereof are carried into the groove 51 as shown in Fig. 10, thus insuring an effective gripping surface and further securely clamping the cord after a cutting operation. It will here be noted that the yielding spring construction 44, heretofore described, permits the jaws to grip the cord sufficiently tight for all operating purposes, but should there be an undue strain upon the said cord, the two jaws may be forced slightly apart by the yielding of the spring and the cord thus released.

57 designates a knife blade or cutter carried by the plate 38 and so positioned thereon as to be brought into engagement with the cord at the proper time in the cycle of operations, so that the same is severed after the knot has been completed. 58 designates an ejector finger, also preferably formed integral with the plate 38, and adapted to move into close proximity to the looper bill 33, and cause the cord to be released from the hook 35 at the proper moment should it form a loop and cling to the hook.

In connection with the plate 38, it will be noted that the same is provided with an apertured boss 59, which is adapted to receive a pin 60 of a link 61, the said link being pivoted at 62 to the frame 1, and also having an extension 63 which terminates in a pusher toe 64, the path of movement of which is adjacent to the path of the looper bill 33, and its function is to correctly position the cord within the looper bill at the proper time.

65 designates a guard member, preferably, formed integral with the annular member 46 and having a curved face 66 which is adapted to serve as a guide for the tying cord. It will be understood that the said guard 65 receives a swinging or partial rotary movement with the plate 38 and the parts are so correlated as to effect proper timing thereof with respect to the position of the tying cord.

The operation of the machine will be understood, and may be described as follows, having particular reference to Figs. 1, 2 and 14 to 21 inclusive:—

In Fig. 1 the machine parts and the tying cord are shown at the beginning of the cycle of operations, which when completed have formed a knot of the desired type, the knot in this instance being of that type known as a weaver's knot. In Fig. 1 it will be assumed that the free end of the tying cord has been engaged by the gripping devices embodying the parts carried by the plate 38 and the extension 41, while the means for positioning the tying cord in the gripping device will be explained later in the description of the operation. From the gripping device the tying cord, through the movement of the needle arm 6, on its return stroke, has positioned the said cord so that it rests upon the finger 34, passing around the looper bill 33, and as shown in dotted lines in Fig. 1 being carried by the needle arm to the extreme left side of the mechanism in order that the bundle of grain or other material may be effectively packed into place so that upon the return stroke of the needle arm the tying cord will be wrapped tightly about the bundle with the tying cord resting upon the curved supporting surface 66 and crossing in the rear of the curved guide 67 of the pusher toe 64, whereupon a rotation of the looper bill 33 will cause the latter to pass above this portion of the cord. The above described position of the cord and looper bill is shown in Fig. 14.

It will be understood that, during the positioning of the feed portion of the tying cord, the needle arm 6 is moving upwardly through the opening 5 in the frame 1, and at the moment that the cord has assumed the position of Fig. 14, the cam 22 of the said arm 6 contacts with the locking member 17, shifting the same along the rod 15 and bringing the locking lug 16 out of the path of movement of the looper arm lug 19. As soon as this takes place the rod 20 is free to move, and since the opening 23 of the needle arm 6 has picked up the lug 19, the two parts move together, thus causing the frame 25 to swing about its pivot 26, which movement causes the pinion 31 to rotate, and thus impart a partial rotation to the looper bill 33. The first effect of the movement of the bill is shown in Fig. 15, where that part of the cord which is engaged by the finger 34 is crossed over the feed end of the tying cord to form substantially a figure 8 through the lower or bundle end of which the end of the looper bill is adapted to pass. In this Fig. 15, the said bill is shown just entering this loop. The looper bill 33, continuing its movement, now takes the position shown in Fig. 16, with the upper loop of the said figure 8 reversed with respect to its former position and looped about the looper bill within the lower or bundle loop. For the sake of clearness in describing this operation I have designated the free end of the tying cord, which is held by the gripping devices, by the reference letter a, and the feeding end of the tying cord by the letter b, and since during the foregoing operations the end b has been held taut by the needle arm in the same position as shown in Fig. 14, a further upward movement of the looper bill will cause the cord to pass within the recess 37, it being guided therein by the curved hook portion 35. The needle arm having now reached the end of its forward stroke, begins the return movement, thereby causing the lever 20 to actuate the parts controlled thereby, so as to reverse the direction of the movement of the looper bill, and its first position is shown in Fig. 17, where the hook 35 has grasped the cord adjacent the end b preparatory to carrying it down through the loop located upon the looper bill.

Figs. 18 and 19 show the several positions of the cord as the looper bill reverses its movement, and at the completion of this movement the end b has been looped through the small figure 8 loop and the knot is complete except for drawing it taut. As soon as the parts have reached this position the plate 38, which has also been swinging about its pivot, has reached the point where the knife blade 57 is in position to cut the end b, thus severing the knot portion of the cord so that the bundle may be removed from the machine. It will be apparent that when the end b has been severed, it will, through a further movement of the looper bill downward, as shown in Fig. 20, be drawn through the knot loop, thus leaving the completed knot as shown in Fig. 21. In connection with this last step it will be noted that if there is any tendency of the cord to catch in the looper hook and prevent the removal of the knot portion, it will be prevented by the movement of the ejector finger 58 which at this time advances, passes in close proximity to the end of the looper bill, and pushes the cord free.

Going back for a moment, now, to the position of the cord at the time the cutter severs the tied portion, attention is directed to the fact that at this time a portion of the end b lies across the plate 38 in front of the flanged shoulder 56, and alined with the groove 51 so that a continuous movement of the plate 38 forces a new portion of the tying cord into the gripping device groove 51, and when the two parts, 41 and 38 have completely telescoped in their gripping action, the tying cord will be looped within the groove 51, once by the flange 54, and a second time by the flange 56, this construction according a firm gripping surface, so that as the gripping members continue their direction of rotation after the cutting step the loop in the knot will be pulled tight or shut by the action of the flange 56. It will be noted further that this movement also causes the cord to be drawn closely and taut about the bundle.

The foregoing step is quite an important one in connection with the tying of the knot, since the stepped flange of the plate 38 causes the tying cord to be held at both ends after the bundle loop has been formed around the bundle. This action will probably be clearer when it is stated that the free end of the cord is first passed into the groove 51 and held at two places by the flanged construction, and then as the looper completes the knot, that portion of the cord which is to be severed is then engaged by the flange 56 and pushed into gripped position within the groove 51. As soon as the severing action is completed, this end of the cord which has just been gripped is, by the movement of the parts, drawn forwardly into the groove 51 and closes the loop formed in the knot by the movement of the looper bill. In connection with this completing of the knot it will be noted that the finger 58 is advanced at the proper time with respect to the movement of the looper bill so that should the cord become looped or improperly caught upon the hook 35, this guard arm 65 will release it, thus leaving the looper bill free for the next movement, and also permitting the bundle to be removed from the device.

A further function of the guard arm face 65 is to receive the cord during the forward movement of the needle arm and guide it into position back of the pusher arm guide-face 67, it being noted that these two faces at this time are in alined relation, and therefore a movement of the arm 67 will carry the cord beneath the finger 68 so that the cord lies in the path of the looper bill and may be picked up in the recess 37. As soon, however, as the cord is properly positioned in the looper bill, it will be slipped over the end of the pusher toe 64 and take the position shown in Fig. 1, whereupon a reverse movement of the arm 63 will cause its toe 64 to carry the cord over into the path of movement of the flange 54.

Attention is again directed to the employment of the novel binding arm 10, the function of which is to maintain the bundle of material compressed during the knot tying operation, the desirability of this member will be apparent when it is stated that heretofore in practice the needle arm has been utilized as a means to compress the bundle during the tying operation. Where the needle arm is used for such a purpose, it will be apparent that any relaxation of the said arm before the knot is finished results in the bundle loosening and the tying cord is either not tied at all, or tied so loosely as to serve no useful purpose. That the needle arm must thus release the bundle is of course apparent, since it begins its return stroke before the knot is completed. In my novel construction I have provided a means which is automatically actuated and serves to hold the bundle under compression during the entire binding and tying operation, and it is therefore impossible for the material to become loosened or displaced before the knot is actually completed. In connection with this construction it will be further noted that the retaining arm 10 is preferably actuated by a cam movement which is so timed as to give the retaining arm 10 a lead over the movement of the needle arm, thereby insuring a successful completion of each bundling and tying operation.

It will now be apparent that I have devised a complete unitary structure, simple in construction, effective in operation, and consisting of few parts, all of which are so arranged and combined as to produce the desired knot-tying operation, and while I have shown the apparatus as I have practically constructed it for use, which I have found particularly well adapted for commercial purposes, I do not limit myself to the details or special relative movement of the parts, as my invention is intended broadly to include an oscillatory gripping device embodying as adjuncts thereof certain cutting devices, guards and positioning devices, together with a looper bill mounted for rocking movement, as can readily be understood from the foregoing description. Therefore, while I prefer the construction shown, I do not confine myself to the details, as they may be varied as found most convenient in any special application of my invention.

Having now described my invention, what I claim as new and desire to protect by Letters Patent is:—

1. In a knot-tier, a frame, a cord gripping mechanism comprising an arm pivoted to said frame, a plate carried by said arm and movable with respect thereto, a portion of said plate being adapted to interfit with a portion of said arm to form gripping jaws to hold a tying cord, a looper bill mounted for rocking movement adjacent said gripping mechanism, means to properly position said cord with respect to said gripping mechanism and said looper bill, and means to respectively actuate said parts whereby a weaver's knot is formed in said cord.

2. In a knot-tier, a frame, a cord gripping mechanism comprising an arm pivoted to said frame, a plate carried by said arm and movable with respect thereto, a portion of said plate being adapted to interfit with a portion of said arm to form gripping jaws to retain a tying cord, means to press said plate and arm together to increase the gripping action, a looper bill mounted for rocking movement adjacent said gripping mechanism, means to properly place said cord with respect to said gripping mechanism and said looper bill, and means to respectively actuate said parts whereby a weaver's knot is formed in said cord.

3. In a knot-tier, a frame, a cord gripping mechanism comprising an arm pivoted to said frame, a plate carried by said arm and movable with respect thereto, a portion of said plate being adapted to interfit with a portion of said arm to form gripping jaws to retain a tying cord, yielding means to press said plate and arm together to increase the gripping action, a looper bill mounted for rocking movement adjacent said gripping mechanism, means to properly place said cord with respect to said gripping mechanism and said looper bill, and means to respectively actuate said parts whereby a weaver's knot is formed in said cord.

4. In a knot-tier, a frame, a cord gripping mechanism comprising an arm pivoted to said frame, a plate carried by said arm and movable with respect thereto, a portion of said plate being adapted to interfit with a portion of said arm to form gripping jaws to retain a tying cord, a spring compressed between said arm and a portion of said plate to normally increase the pressure of said gripping jaws, a looper bill mounted for rocking movement adjacent said gripping mechanism, means to properly place said cord with respect to said gripping mechanism and said looper bill, and means to respectively actuate said parts whereby a weaver's knot is formed in said cord.

5. In a knot-tier, a frame, a cord gripping mechanism comprising an arm pivoted to said frame, having an opening therein, a plate, a pin on said plate journaled in said opening to provide relative movement between said plate and arm, a portion of said plate being adapted to interfit with a portion of said arm to form gripping jaws to retain a tying cord, a spring seated on said arm and encircling a portion of said arm about said pin, a stud threaded into said pin, a head on said stud engaging said spring to hold the same normally under compression to increase the gripping action between said jaws, a looper bill mounted for rocking movement adjacent said gripping mechanism, means to properly position said cord with respect to said gripping mechanism and said looper bill, and means to respectively actuate said parts whereby a weaver's knot is formed in said cord.

6. In a knot-tier, a frame, a cord gripping mechanism comprising an arm pivoted to said frame and having a groove therein, a plate carried by said arm and movable with respect thereto, a flange on said plate adapted during the movement of said plate to enter said groove to form a cord retaining means, means to properly position said cord with respect to said gripping mechanism, a looper bill mounted for rocking movement adjacent said gripping mechanism, and means to respectively actuate said parts whereby a weaver's knot is formed in said cord.

7. In a knot-tier, a frame, a cord gripping mechanism comprising an arm pivoted to said frame having a groove therein, a plate carried by said arm and movable with respect thereto, a stepped flange secured to said plate and adapted during the movement of said plate to enter said groove to form gripping jaws for holding said tying cord at a plurality of points, means to properly position said cord with respect to said gripping mechanism, a looper bill mounted for rocking movement adjacent said gripping mechanism, and means to respectively actuate said parts whereby a weaver's knot is formed in said cord.

8. In a knot-tier, a frame, a cord gripping mechanism comprising an arm pivoted to said frame and having a groove therein, a plate carried by said arm and movable with respect thereto, a stepped flange secured to said plate and adapted during the movement of said plate to enter said groove to form gripping jaws for holding said tying cord at a plurality of points, yielding means for normally pressing said jaws together to increase the gripping action thereof, means to properly position said cord with respect to said gripping mechanism, a looper bill mounted for rocking movement adjacent said gripping mechanism, and means to respectively actuate said parts whereby a weaver's knot is formed in said cord.

9. In a knot-tier, a frame, a cord gripping mechanism comprising an arm pivoted to said frame, having a groove therein, a plate mounted on said arm for oscillatory movement with respect thereto, a stepped flange secured to said plate for engaging a tying cord at a plurality of points and adapted to enter said groove and coact therewith to grip said cord for a predetermined length of time, means to properly position said cord with respect to said gripping mechanism, a looper bill mounted for rocking movement adjacent said gripping mechanism, and means to respectively actuate said parts whereby a weaver's knot is formed in said cord.

10. In a knot-tier, a frame, a cord gripping mechanism comprising an arm pivoted to said frame and having a groove therein, a plate carried by said arm and movable with respect thereto, a flange on said plate adapted during the movement of said plate to enter said groove to form a cord retaining means, means to properly position said cord with respect to said gripping mechanism, a looper bill mounted for rocking movement adjacent said gripping mechanism, means to respectively actuate said parts whereby a weaver's knot is formed in said cord, and a cord guiding guard fixed to said arm and positioned adjacent said looper bill.

11. In a knot-tier, a frame, a cord gripping mechanism comprising an arm pivoted to said frame and having a groove therein, a plate carried by said arm and movable with respect thereto, a flange on said plate adapted during the movement of said plate to enter said groove to form a cord retaining means, means to properly position said cord with respect to said gripping mechanism, a looper bill mounted for rocking movement adjacent said gripping mechanism, means to respectively actuate said parts whereby a weaver's knot is formed in said cord, a cord guiding guard fixed to said arm and positioned adjacent said looper bill, and a cord severing means carried by said plate and adapted to engage said cord at a predetermined length.

12. In a knot-tier, a frame, a cord gripping mechanism comprising an arm pivoted to said frame and having a groove therein, a plate carried by said arm and movable with respect thereto, a flange on said plate adapted during the movement of said plate to enter said groove to form a cord retaining means, means to properly position said cord with respect to said gripping mechanism, a looper bill mounted for rocking movement adjacent said gripping mechanism, means to respectively actuate said parts whereby a weaver's knot is formed in said cord, a cord guiding guard fixed to said arm and positioned adjacent said looper bill, and means operable by the movement of said plate for carrying said cord into position to be engaged by said looper bill.

13. In a knot-tier, a frame, a cord gripping mechanism comprising an arm pivoted to said frame and having a groove therein, a plate carried by said arm and movable with respect thereto, a stepped flange on said plate adapted during the movement of said plate to enter said groove to form a cord retaining means, means to properly position said cord with respect to said gripping mechanism, a looper bill mounted for rocking movement adjacent said gripping mechanism, means to respectively actuate said parts whereby a weaver's knot is formed in said cord, a cord guiding guard fixed to said arm and positioned adjacent said looper bill, and means operable by the movement of said plate for placing said cord in position to be engaged by said stepped flange.

14. In a knot-tier, a frame, a cord gripping mechanism comprising an arm pivoted to said frame and having a groove therein, a plate carried by said arm and movable with respect thereto, a flange on said plate adapted during the movement of said plate to enter said groove to form a cord retaining means, means to properly position said cord with respect to said gripping mechanism, a looper bill mounted for rocking movement adjacent said gripping mechanism, means to respectively actuate said parts whereby a weaver's knot is formed in said cord, a cord guiding guard fixed to said arm and positioned adjacent said looper bill, means operable by the movement of said plate for carrying said cord into position to be engaged by said looper bill, and means carried by said plate for severing said cord at a predetermined time.

15. In a knot-tier, a frame, a cord gripping mechanism comprising an arm pivoted to said frame and having a groove therein, a plate carried by said arm and movable with respect thereto, a stepped flange on said plate adapted during the movement of said plate to enter said groove to form a cord retaining means, means to properly position said cord with respect to said gripping mechanism, a looper bill mounted for rocking movement adjacent said gripping mechanism, means to respectively actuate said parts whereby a weaver's knot is formed in said cord, a cord guiding guard fixed to said arm and positioned adjacent said looper bill, means operable by the movement of said plate for placing said cord in position to be engaged by said stepped flange, and means carried by said plate for serving said cord at a predetermined time.

16. In a knot-tier, a frame, a cord gripping mechanism comprising an arm pivoted to said frame and having a groove therein, a plate mounted on said arm for oscillatory movement, a stepped flange secured to said plate and adapted on the forward movement of said plate to enter said groove to form a gripping means for holding a tying cord, means to hold said cord in said groove on the reverse movement of said plate, a looper bill mounted for rocking movement adjacent said gripping mechanism, means to properly position said cord with respect to said gripping mechanism and said looper bill, and means to respectively actuate said parts whereby a weaver's knot is formed in said cord.

17. In a knot-tier, a frame, a cord gripping mechanism comprising an arm pivoted to said frame and having a groove therein, a plate mounted on said arm for oscillatory movement, a stepped flange secured to said plate and adapted on the forward movement of said plate to enter said groove to form a gripping means for holding a tying cord, a lug depending from said arm adapted to hold said tying cord in said groove during the reverse movement of said plate in the opposite direction, a looper bill mounted for rocking movement adjacent said gripping mechanism, means to properly position said cord with respect to said gripping mechanism and said looper bill, and means to respectively actuate said parts whereby a weaver's knot is formed in said cord.

18. In a knot-tier, a frame, a cord gripping mechanism comprising an arm pivoted to said frame and having a groove therein, a plate mounted on said arm for oscillatory movement, a stepped flange secured to said plate and adapted on the forward movement of said plate to enter said groove to form a gripping means for holding a tying cord, a lug having a face curved away from the entrance end of said groove to allow said tying cord to freely enter said groove but to hold said tying cord in said groove during the reverse movement of said flange, a looper bill mounted for rocking movement adjacent said gripping mechanism, means to properly position said cord with respect to said gripping mechanism and said looper bill, and means to respectively actuate said parts whereby a weaver's knot is formed in said cord.

19. In a knot-tier, a frame, a cord gripping mechanism comprising an arm pivoted to said frame, a plate carried by said arm and movable with respect thereto, a portion of said plate being adapted to interfit with a portion of said arm to form gripping jaws to hold a tying cord, a looper bill mounted for rocking movement adjacent said gripping mechanism, an operating lever adapted to actuate said gripping mechanism and said looper bill, means to properly position said cord with respect to said gripping mechanism and said looper bill, and means automatically controlled for locking said lever during a portion of the movement of said positioning means.

20. In a knot-tier, a frame, a cord gripping mechanism comprising an arm pivoted to said frame, a plate carried by said arm and movable with respect thereto, a portion of said plate being adapted to interfit with a portion of said arm to form gripping jaws to hold a tying cord, a looper bill mounted for rocking movement adjacent said gripping mechanism, an operating lever adapted to actuate said gripping mechanism and said looper bill, a locking device for rendering said lever inoperative, a needle arm for properly positioning said cord with respect to said gripping mechanism and said looper bill, and means controlled by the movement of said needle arm for releasing said locking device, and means carried by said needle arm for causing said lever to be actuated when released.

21. In a knot-tying mechanism, a frame, a needle arm mounted for rocking movement adjacent said frame, means carried by said frame controlled by said needle arm for tying a suitable knot in a cord, means carried by said needle arm and adapted to maintain a bundle in packed condition during the time said needle arm is placing said cord about said bundle and said tying mechanism is forming a knot in said cord, and devices for causing the means for maintaining the bundle in packed condition to move forward with the needle during a portion of its movement and then for positively holding said means from further movement whereby the bundle is maintained in packed condition while the needle continues its advance movement for tying the knot.

22. In a knot-tying mechanism, a frame, a needle arm mounted for rocking movement adjacent said frame, means carried by said frame controlled by said needle arm for tying a suitable knot in a cord, a pivoted retaining arm adjacent said needle arm for maintaining the bundle in a packed condition during binding, and means to shift said retaining arm into contact with a bundle to maintain the same in packed condition during the time said needle arm is placing said cord about said bundle and said tying means is forming a knot in said cord, said means causing the retaining arm to move forward with the needle during a portion of its movement and then stopping its forward movement whereby the bundle is maintained in packed condition while the needle continues its advance movement for tying the knot.

23. In a knot-tying mechanism, a frame, a needle arm mounted for rocking movement adjacent thereto, means for tying a suitable knot in a cord controlled by the movement of said needle arm, a pivoted retaining arm mounted adjacent said needle arm, and a cam automatically operable during the actuation of said needle arm and said knot-tying mechanism to shift said retaining arm to a position to cause it to hold the bundle in packed condition and thereafter to hold it in relatively stationary position during the advance of the needle in completing the knot-tying operation.

24. In a knot-tying mechanism, a frame, a needle arm mounted for operation adjacent said frame, means carried by said frame for tying a knot in a binding cord for a bundle, a pivoted retaining arm adjacent said needle arm, and cam means to shift said retaining arm into contact with said bundle, and then hold it stationary to maintain the bundle in packed condition during the time said needle arm continues to advance and place said cord about the bundle and during its coöperation with said tying means to form a knot in said cord.

25. In a knot-tying mechanism, a cord holder to grasp and hold a cord, comprising a plurality of parts having two long jaws adapted to fit together and slide adjacent each other, suitable catches or flange lugs spaced apart upon said holder for carrying said cord into said jaws, a cutter to sever said cord at a predetermined time, means to reciprocate one jaw with respect to the other to grip and thrust the cut end of said cord between said jaws, and means to secure said cut end within said jaws while the reciprocable jaw makes its return stroke to grasp the cord for a new end.

26. In a knot-tying mechanism, a cord holder to grasp and hold a cord, comprising two or more parts having two long jaws, the one a counterpart of the other, and adapted to conform and fit together to slide in close proximity to each other, catches or flange lugs suitably spaced upon one of the moving holder members and adapted to carry the cord forward into said jaws, a cutter for severing said cord at a predetermined time, means to reciprocate one of said jaws to grip and thrust the cut end of said cord forward between said jaws, and means to secure said cut end within said jaws as the reciprocal jaw moves back to grasp the cord for a new end.

27. In a knot-tying mechanism, a frame or support, a cord conveying arm operatively mounted adjacent said frame, a carrier pivoted to said frame, a looper journaled on said carrier, an extension on said carrier projecting in front of said looper, a jaw member carried by said extension, a second jaw member conforming to said first jaw member and adapted to interfit therewith, a spring to clamp said jaw members together, a cutter carried by one of said members for severing said cord at a predetermined time, means to reciprocate one of said jaw members with respect to the other, whereby said cord is grasped and fed between said jaw members, and means to retain the cut end of said cord in said jaws while one of said jaws reverses its movement in the formation of the knot.

28. In a knot-tying mechanism, a frame or support for said mechanism, an arm mounted adjacent said support for carrying a cord to said mechanism, a looper mounted upon said support for forming a loop in said cord, a holder and a cutter fixed adjacent said looper to respectively hold and cut said cord, said holder comprising a clamping device composed of interfitting members forming two long jaws, a spring to clamp said jaws together, catches suitably spaced apart upon said clamping device, means to reciprocate said clamping device to grip and thrust said cord between said jaws, and means to retain the cut end in said clamping device while one portion of said device moves back to grasp said cord for a new end.

In testimony of which invention, I hereunto set my hand.

EDWARD W. JENKINS.

Witnesses:
MIRIAM M. DYSON,
LEILA JENKINS.

Copies of this patent may be obtained for five cents each, by addressing the "Commissioner of Patents, Washington, D. C."